(12) United States Patent
Goicochea et al.

(10) Patent No.: US 10,533,779 B2
(45) Date of Patent: Jan. 14, 2020

(54) ADSORPTION HEAT EXCHANGER DEVICES

(75) Inventors: Javier V. Goicochea, Rueschlikon (CH); Bruno Michel, Zurich (CH); Patrick Ruch, Jenins (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1072 days.

(21) Appl. No.: 14/128,723

(22) PCT Filed: Jun. 8, 2012

(86) PCT No.: PCT/IB2012/052900
§ 371 (c)(1),
(2), (4) Date: Apr. 13, 2016

(87) PCT Pub. No.: WO2013/001390
PCT Pub. Date: Jan. 3, 2013

(65) Prior Publication Data
US 2016/0252278 A1    Sep. 1, 2016

(30) Foreign Application Priority Data
Jun. 30, 2011 (EP) ..................................... 11172080

(51) Int. Cl.
*F25B 17/08* (2006.01)
*F25B 37/00* (2006.01)
(Continued)

(52) U.S. Cl.
CPC .............. *F25B 17/08* (2013.01); *F25B 37/00* (2013.01); *F28F 3/02* (2013.01); *B82Y 30/00* (2013.01);
(Continued)

(58) Field of Classification Search
CPC .. F25B 17/08; F25B 37/00; F28F 3/02; C01B 31/022; C01P 2006/32; B82Y 30/00
See application file for complete search history.

(56) References Cited

U.S. PATENT DOCUMENTS 5,456,093 A    10/1995   Dunne et al.
5,518,977 A     5/1996   Dunne et al.
(Continued)

FOREIGN PATENT DOCUMENTS

CN    1349605 A    5/2002
CN    2566197 Y    8/2003
(Continued)

OTHER PUBLICATIONS

Translation of description of DE612963, retrieved on Nov. 5, 2018 (Year: 2018).*
(Continued)

*Primary Examiner* — Ana M Vazquez
(74) *Attorney, Agent, or Firm* — Cantor Colburn LLP; Samuel Waldbaum (57) ABSTRACT

Adsorption heat exchanger devices (11, 30) are provided for solid sorption refrigeration systems (1). Such a device includes a heat exchanger (12) having a plurality of projections (17) arranged for extending into an adsorbate of the system (1) in use. An adsorption structure (13, 31) is formed on the heat exchanger (12) for adsorption of said adsorbate. The adsorption structure (13, 31) comprises a plurality of elongate adsorption elements (20) extending outwardly from each of said projections (17) of the heat exchanger (12).

16 Claims, 3 Drawing Sheets

(51) Int. Cl.
  *F28F 3/02* (2006.01)
  *B82Y 30/00* (2011.01)
(52) U.S. Cl.
  CPC ....... *C01P 2006/32* (2013.01); *Y10S 977/742* (2013.01)

(56) References Cited

U.S. PATENT DOCUMENTS

| | | | |
|---|---|---|---|
| 7,291,271 | B2 | 4/2007 | Galbraith |
| 7,981,199 | B2 * | 7/2011 | Burk ................... F25B 35/04 96/154 |
| 9,022,099 | B2 * | 5/2015 | Fukuta ................... C09K 5/10 165/133 |
| 2003/0091872 | A1 | 5/2003 | Yan |
| 2004/0104021 | A1 * | 6/2004 | Kujirai ................... F28F 3/02 165/185 |
| 2004/0200603 | A1 * | 10/2004 | Nagashima ............ F25B 35/04 165/133 |
| 2008/0023181 | A1 * | 1/2008 | Dunne ................... F25B 35/04 165/133 |
| 2008/0093059 | A1 * | 4/2008 | Nishida ............... B01D 53/261 165/133 |
| 2009/0217526 | A1 * | 9/2009 | Mittelbach ............ B01J 20/103 29/890.03 |
| 2009/0217691 | A1 | 12/2009 | Schmidt |
| 2010/0162734 | A1 * | 7/2010 | McCormick ............ F25D 3/12 62/56 |
| 2010/0196249 | A1 | 8/2010 | Hata et al. |
| 2011/0011803 | A1 | 1/2011 | Koros |

FOREIGN PATENT DOCUMENTS

| | | | | |
|---|---|---|---|---|
| CN | 201209975 | Y | | 3/2009 |
| DE | 612963 | | * 5/1935 | ............. F25B 17/08 |
| JP | 10-185348 | A | | 7/1998 |
| JP | 2006-284051 | A | | 10/2006 |
| JP | 2006284051 | A | | 10/2006 |
| WO | 9918366 | A1 | | 4/1999 |
| WO | WO 00/66954 | A1 | | 11/2000 |
| WO | WO 2005/036073 | A1 | | 4/2005 |
| WO | WO2005036073 | A1 | | 4/2005 |
| WO | 2009138223 | A2 | | 11/2009 |
| WO | 2009138223 | A3 | | 2/2010 |

OTHER PUBLICATIONS

Translation of description of JP2006-284051, retrieved on Nov. 5, 2018 (Year: 2018).*
Basile, et al. "Thermal Conductivity of Natural Zeolite-PTFE Composites," Heat Recovery Systems & CHP, vol. 12, No. 6, pp. 497-503, 1992.
Critoph, et al. "Review of trends in solid sorption refrigeration and heat pumping technology," Invited Review Paper, Proc. IMechE, vol. 219, Part E: J. Process Mechanical Engineering, 2005, pp. 285-300.
Frackowiak, et al. "Enhanced capacitance of carbon nanotubes through chemical activation," Chemical Physics Letters 361 (2002), pp. 35-41.
Freni, et al. "Zeolite synthesised on copper foam for adsorption chillers: A mathematical model," Microporous and Mesoporous Materials 120 (2009), pp. 402-409.
Futaba, et al. "General Rules Governing the Highly Efficient Growth of Carbon Nanotubes," Advanced Materials, 2009, vol. 21, pp. 4811-4815.
Hiraoka, et al. "Compact and Light Supercapacitor Electrodes from a Surface-Only Solid by Opened Carbon Nanotubes with 2 200 m2 g-1 Surface Area," Advanced Functional Materials, 2010, vol. 20, pp. 422-428.
Kandlikar, et al. "Evolution of Microchannel Flow Passages—Thermohydraulic Performance and Fabrication Technology," Heat Transfer Engineering, 2003, vol. 24, No. 1, pp. 3-17.
Marsh, et al. Activated Carbon, 1st Edition, Elsevier Science, 2006, ISBN: 9780080444635, 552 pages.
Tatlier, et al. "A novel approach to enhance heat and mass transfer in adsorption heat pumps using the zeolite—water pair," Microporous and Mesoporous Materials, vol. 27 (1999), pp. 1-10.
Tatlier, et al. "The effects of thermal and mass diffusivities on the performance of adsorption heat pumps employing zeolite synthesized on metal supports," Microporous and Mesoporous Materials, vol. 28 (1999), pp. 195-203.
Wang et al. "Research and development of consolidated adsorbent for adsorption systems," Renewable Energy, vol. 30 (2005), pp. 1425-1441.
Wang, et al. "A review on adsorption working pairs for refrigeration," Renewable and Sustainable Energy Reviews, vol. 13, (2009), pp. 518-534.
Yun, et al. "Growth Mechanism of Long Aligned Multiwall Carbon Nanotube Arrays by Water-Assisted Chemical Vapor Deposition," J. Phys. Chem. B, 2006, vol. 110, pp. 23920-23925.

* cited by examiner

ADSORPTION HEAT EXCHANGER DEVICES

CROSS-REFERENCE TO RELATED APPLICATIONS

This application claims priority under 35 U.S.C. § 371 from PCT Application, PCT/IB2012/052900, filed on Jun. 8, 2012, which claims priority from European Patent Application No. 11172080.1 filed on Jun. 30, 2011, the entire contents of both applications are incorporated herein by reference.

This invention relates generally to adsorption heat exchanger devices for use in solid sorption refrigeration systems. Adsorption heat exchanger devices are provided together with methods for making such devices and apparatus incorporating these devices.

Solid sorption refrigeration systems are driven by the adsorption and desorption of a refrigerant vapor (the adsorbate) by a solid substance (the adsorbent) which is usually highly porous. In contrast to conventional vapor-compression cooling systems which are driven by a mechanical compressor, no electrical energy is needed to drive the refrigeration cycle. The basic cycle involves an adsorption phase and a desorption phase. In the adsorption phase, the refrigerant vapor is adsorbed by the adsorbent substance resulting in release of heat. In the desorption phase, heat is applied to the adsorbent causing desorption of the refrigerant. The heat transferred during these processes is conveyed by a heat exchanger between the adsorbent and a heat transfer fluid (e.g. water or a water-glycol mixture) or an external environment. The adsorption and desorption processes occur in conjunction with evaporation and condensation of refrigerant in an evaporator/condenser. The adsorption of the gaseous refrigerant lowers the vapor pressure, promoting evaporation of the liquid refrigerant in the evaporator. During this evaporation, heat is extracted from an environment to be cooled, resulting in refrigeration. By supplying heat to the adsorbent via the heat exchanger, the adsorbed refrigerant is released into the vapor phase, thus regenerating the adsorbent material for the next adsorption cycle. The now gaseous adsorbate passes to a condenser where heat rejection to the environment takes place. As in conventional vapor-compression cooling, the liquid refrigerant is passed through a control device (e.g. an expansion valve) back into the evaporator, and the cycle can then be repeated.

The refrigeration cycle is driven entirely by heat input during the desorption phase without further input of mechanical work. Solid sorption cooling may therefore be preferred over conventional vapor-compression cooling where excess heat is readily available, e.g. from the sun (solar cooling) or as waste heat from other sources such as power dissipation in datacenters. Another advantage is that the usual refrigerants, such as water and methanol, used in solid sorption cooling are environmentally friendly and make a negligible contribution to global warming, unlike the fluorocarbon refrigerants typically used in vapor-compression cooling.

Despite the advantages, the cooling power of solid sorption cooling systems is very low compared to vapor compression cooling systems of the same size. The low specific cooling power is due, in part, to the poor heat transfer characteristics of the adsorbent material. In first-generation systems, the adsorber units used beds of loose adsorbent grains lying on the metal heat exchanger surface. Recent efforts to improve thermal conductivity of adsorbents include the use of monolithic adsorbents instead of granular adsorbent material and use of adsorbent materials with high thermal conductivity. Consolidated adsorbent materials have been formed of graphite, metallic foams, or adsorbent grains bound in a matrix such as resin. Composite adsorbent materials have also been produced from a mixture of adsorbent particles and particles with higher thermal conductivity. These consolidated materials generally suffer from poor permeability to the adsorbate vapor whereby flow of adsorbate within the structure is significantly hindered. Due to long diffusion paths to adsorption sites in granular or consolidated adsorbents, the vapor pressure near the inner adsorbent surface is slow to adapt to variations in the system pressure, thereby limiting the rate of cooling and regeneration of the adsorbent. More recently, heat transfer at the thermal interface between the heat exchanger and adsorbent material has been improved by coating the heat exchanger fins or tubes with thin-film adsorbent coatings formed by adsorbent material dispersed in a suitable matrix or by direct synthesis of the adsorbent, usually a type of zeolite, on the external heat exchanger surface. Our copending European Patent Application No. 10196440.1, filed 22 Dec. 2010, discloses integrated adsorption heat exchanger devices offering a further improvement in heat transfer coefficients.

US Patent Application Publication No. 2010/0196249 A1 discloses aligned carbon nanotube bulk structures for numerous stated applications including heat dissipation materials, heat conductors such as heat exchangers, electric conductors, electrodes, batteries, capacitors and supercapacitors, emission devices, or adsorbents for gas storage and transportation. Carbon nanotubes subjected to an activation process for enhanced operation of supercapacitor electrodes are also discussed in "Enhanced capacitance of carbon nanotubes through chemical activation", Frackowiak et al., Chemical Physics Letters 361 (2002) 35-41, and "Compact and Light Supercapacitor Electrodes from a Surface-Only Solid by Opened Carbon Nanotubes with 2200 $m^2$ $g^{-1}$ Surface Area", Hiraoka et al., Advanced Functional Materials, 2010, 20, 422-428.

One embodiment of an aspect of the present invention provides an adsorption heat exchanger device for a solid sorption refrigeration system. The device comprises:

a heat exchanger having a plurality of projections arranged for extending into an adsorbate of the system in use; and an adsorption structure formed on the heat exchanger for adsorption of said adsorbate, the adsorption structure comprising a plurality of elongate adsorption elements extending outwardly from each of said projections of the heat exchanger.

In adsorption heat exchanger devices embodying this invention, the heat exchanger has projections on the adsorption side of the device, the projections being arranged so as to extend into the adsorption region of the system which contains the adsorbate in use. The heat exchanger (which is of course non-porous and so substantially impervious to the adsorbate to inhibit passage and hence escape of adsorbate from the system) has an adsorption structure formed thereon. This structure provides for adsorption of the adsorbate vapor in use. The adsorption structure comprises elongate adsorption elements arranged such that a plurality of these adsorption elements extends outwardly from each of the heat exchanger projections into the adsorption region. This device arrangement provides a hierarchical partitioning, or subdivision, of the adsorption region, thereby providing a hierarchical branching of the void which contains the adsorbate vapor in use. A first level of partitioning/ branching is provided by the heat exchanger projections. The elongate adsorption elements extending outwardly from the heat exchanger projections then further partition the areas between projections, providing a second level of branching on a smaller scale than the first level. This hierarchically-structured configuration of heat exchanger and adsorption structure provides a highly efficient arrangement of thermal pathways, giving good heat transport characteristics, coupled with an efficient hierarchical mass transport network permitting highly effective transport of adsorbate vapor to adsorption sites. Compared to prior systems, embodiments of the invention thus offer improved thermal conductivity without compromising permeability to adsorbate vapor. The heat and mass transfer advantages of embodiments of the invention can also be achieved without compromising on volume filling fraction of adsorbent (i.e. the amount of inactive volume or "dead space") which can be a drawback with the prior thin-film coating systems described above. These and further advantages of embodiments of the invention will be discussed in more detail below.

The heat exchanger projections could in general comprise any projecting formations and could have a regular or irregular structure. Examples of such projections include fins, pins, lamellae, bends and folds, etc. In preferred embodiments, however, the projections of the heat exchanger have a cross-section which is elongate in the direction extending into the adsorbate. Particular examples here include fins, pins and lamellae. Such high aspect ratio structures, which are generally long and thin in a direction extending into the adsorption region, offer particularly efficient heat flow paths to adsorbent together with a large surface area for the overlying adsorption structure. Devices can of course be envisaged where not all of the heat exchanger projections have adsorption elements formed thereon, though ideally adsorption elements are formed on every projection for maximum efficiency. In particularly preferred embodiments, each elongate adsorption element extends substantially perpendicularly to the surface of the heat exchanger projection on which it is formed. This substantially perpendicular arrangement (e.g. within about 5° of the perpendicular subject to any flexing/curvature as discussed below) of the adsorption elements provides the basis for exceptionally efficient device structures as described in detail below. In some such devices, the arrangement of the heat exchanger projections, and the arrangement of the adsorption elements thereon, can be such that adsorption elements on adjacent projections are interleaved. Such an overlapping arrangement of adsorption elements on adjacent projections offers highly efficient use of space. In particularly efficient arrangements, adsorption elements on a given heat exchanger projection are substantially mutually aligned. That is, some or all of the adsorption elements on a heat exchanger projection extend in substantially the same direction.

The adsorption elements of the structure provide for adsorption of the adsorbate in use and are therefore wholly or at least partially adsorbent. In some devices the adsorption elements are formed of an inherently adsorbent material and, most preferably, an activated adsorbent material, i.e. a material which is inherently adsorbent and which has been subjected to an activation process to increase the active surface area and enhance adsorbency. Particular examples will be described below. In other embodiments the adsorption elements may be formed of a thermally conductive material having an adsorbent material thereon. The adsorbent material here may be a coating, e.g. film-like coating (which need not be uniform or wholly continuous) of an adsorbent such as porous silica or zeolite, or a granular adsorbent material.

In preferred embodiments, the adsorption elements comprise fibers, i.e. generally long, thin threads or filaments of some appropriate material. Carbon nanotubes provide a particularly preferred example of inherently adsorbent fibers. Examples of non-adsorbent materials include metal or ceramic fibers to which adsorbent can then be applied as described above.

Even where the adsorption elements are inherently adsorbent, the adsorption structure preferably includes a first particulate material applied to the adsorbent elements and comprising adsorbent particles of a first size permitting entry of the particles between adjacent adsorption elements of the structure. This contributes additional adsorbency, increasing the packing density for adsorption, and provides another level of the overall hierarchical structure of the device, further portioning the adsorption region to increase the active surface area exposed to adsorbate. In particularly preferred devices, the adsorption structure further includes a secondary particulate material applied to the adsorbent elements. This comprises secondary particles of a second size which is less than the first size, permitting entry of the secondary particles between adjacent adsorbent particles of the first particulate material near contact points thereof. This bimodal size distribution of particulate adsorbent improves both packing density and thermal conductivity of the adsorbent structure. The smaller, secondary particles effectively enlarge the contact points between the larger, first particles, thereby improving thermal contact. The secondary particles also provide a further level to the overall hierarchical structure. Preferred devices embodying the invention therefore provide for multilevel hierarchical branching of the adsorption region void, offering exceptional adsorption efficiency as well as excellent heat transport characteristics. Further features and advantages of preferred embodiments will be described below.

An embodiment of a second aspect of the invention provides adsorber apparatus for a solid sorption refrigeration system. The apparatus comprises one or more adsorption heat exchanger devices according to the first aspect of the invention, the device(s) defining an adsorption region for passage of adsorbate and being arranged such that the heat exchanger projections extend into the adsorption region.

An embodiment of a third aspect of the invention provides a method for making an adsorption heat exchanger device for a solid sorption refrigeration system. The method comprises forming an adsorption structure, for adsorption of an adsorbate of said system, on a heat exchanger having a plurality of projections, the adsorption structure comprising a plurality of elongate adsorption elements extending outwardly from each of said projections of the heat exchanger.

In general, where features are described herein with reference to an embodiment of one aspect of the invention, corresponding features may be provided in embodiments of another aspect of the invention.

Preferred embodiments of the invention will now be described, by way of example, with reference to the accompanying drawings in which.

Figure 1A:
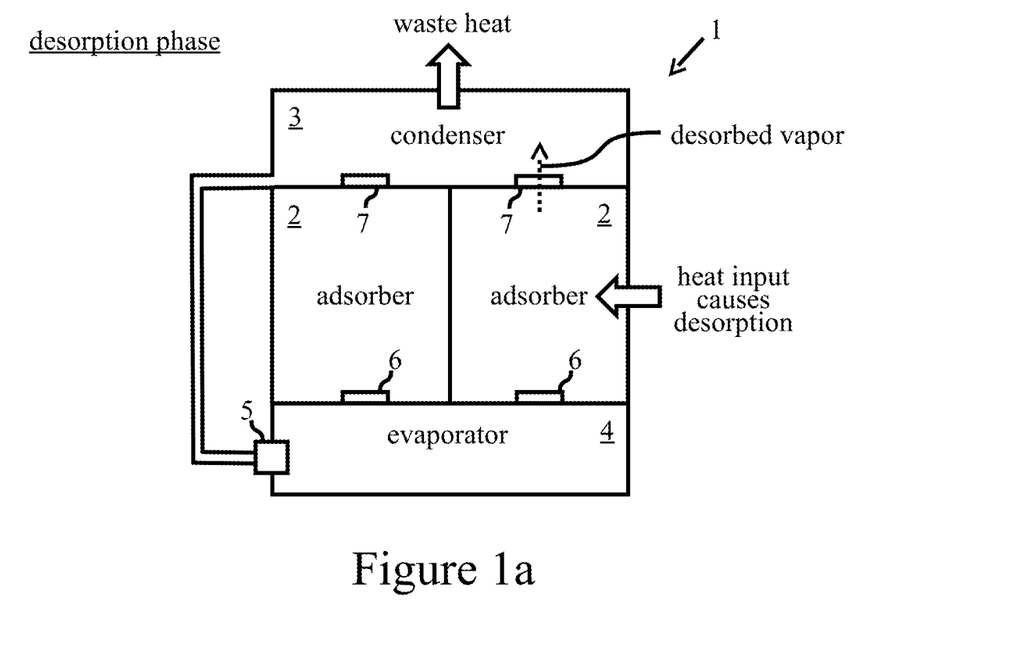
FIGS. 1a and 1b illustrate basic operating phases of a solid sorption refrigeration system.
Figure 1B:
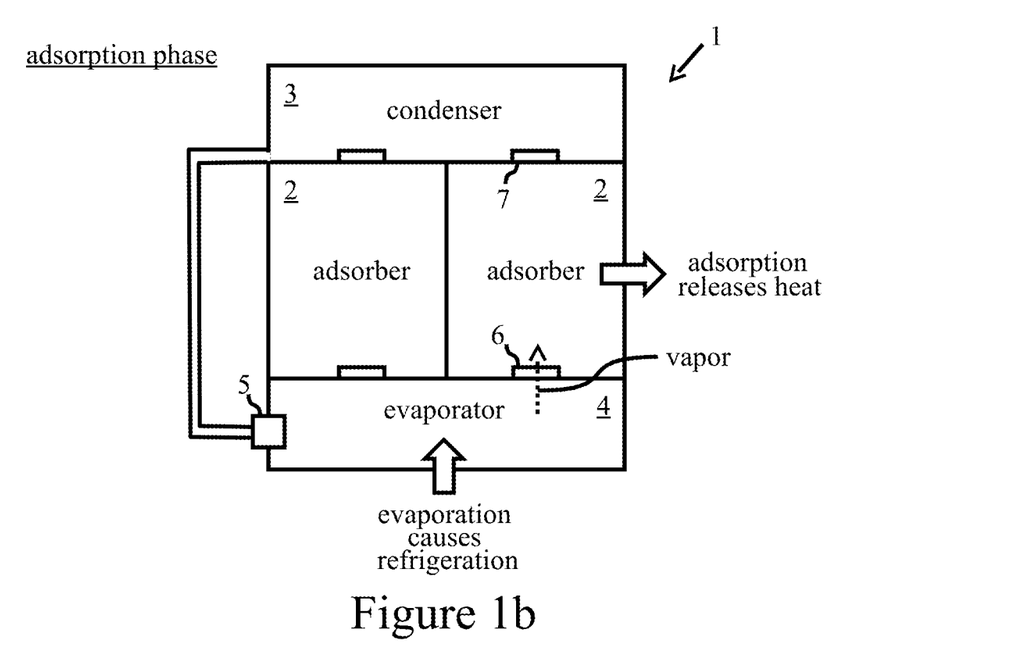

FIGS. 1a and 1b are schematic illustrations of an exemplary solid sorption refrigeration system 1 in which adsorption and heat exchanger devices embodying the invention may be employed. The two figures illustrate the two main phases of the refrigeration cycle, with the solid arrows representing heat flow in each case. This simple system includes two adsorber units 2, a condenser 3 and an evaporator 4. A pipe for passage of condensate from condenser 3 to evaporator 4 terminates in a control device 5, here an expansion valve. The adsorber units 2 are connected to evaporator 4 and condenser 3 via one-way valves 6, 7 as indicated in the figure.

Each unit 2 of system 1 includes adsorption apparatus comprising a plurality of adsorption heat exchanger devices to be described in detail below. The adsorption heat exchanger devices are arranged in each unit such that refrigerant vapor, received from the evaporator 4 via valve 6 during the adsorption phase, passes into an adsorption region where it flows over the adsorbent structures of the devices. The vapor is channeled via these structures toward condenser 3 during desorption, escaping from the unit via valve 7 during this phase. During these processes, a heat transfer fluid (HTF), usually water-based, flows over the heat exchanger structures of the devices and is channeled by these structures between fluid inlets and outlets (not shown in the figures) of unit 2. Three reservoirs (not shown) at different temperatures are employed for operation of the system 1: a high temperature ("hot") reservoir, a low temperature ("chilled") reservoir, and an intermediate temperature ("cold") reservoir as discussed further below. In practice, each reservoir may be connected to the system in FIGS. 1a and 1b by separate HTF loops. The particular mechanisms via which the refrigerant and HTF are delivered to and from the adsorption heat exchanger devices in each adsorption unit 2 will depend on the precise form and arrangement of these devices. Such mechanisms are well known in the field of adsorption systems and suitable mechanisms for a given arrangement will be readily apparent to those skilled in the art.

The basic operating cycle is illustrated in the figures for the right-hand adsorber unit 2. FIG. 1a illustrates the desorption phase of the cycle. At the start of this phase, the refrigerant fluid (e.g. water or methanol) is fully adsorbed within adsorber unit 2. The adsorber unit is then heated by supplying hot HTF to the unit. Heat is thus transferred via the heat exchangers to the adsorbent structures, causing evaporation and hence desorption of the refrigerant. The refrigerant vapor passes via valve 7 to condenser 3 where the vapor condenses under the high pressure resulting from the desorption process. Heat is rejected to the environment during this process and transferred to cold HTF. The adsorption phase commences when condensation is complete. The liquid refrigerant is passed though expansion valve 5 into evaporator 4 causing partial vaporization. As shown in FIG. 1b, the reduced pressure in evaporator 4 results in further evaporation of refrigerant, drawing heat from the environment during this process and thus causing environmental cooling and a low temperature of chilled HTF. Refrigerant vapor passes via valve 6 to adsorber unit 2 and is re-adsorbed, reducing system pressure and promoting further vaporization. Heat rejected by the refrigerant during adsorption is transferred via the heat exchangers in unit 2 to cold HTF at the intermediate temperature. The adsorption phase continues until the refrigerant is fully adsorbed, and the cycle is then complete.

To obtain more continuous cooling, the left-hand adsorber unit in system 1 can be driven in antiphase with the right-hand unit so that adsorption in one unit occurs concurrently with desorption in the other unit. Indeed, while two adsorber units are provided in the simple system shown, in practice systems may use multiple units, operating with appropriate phase shifts, to produce more efficient and continuous cooling.

Figure 2:
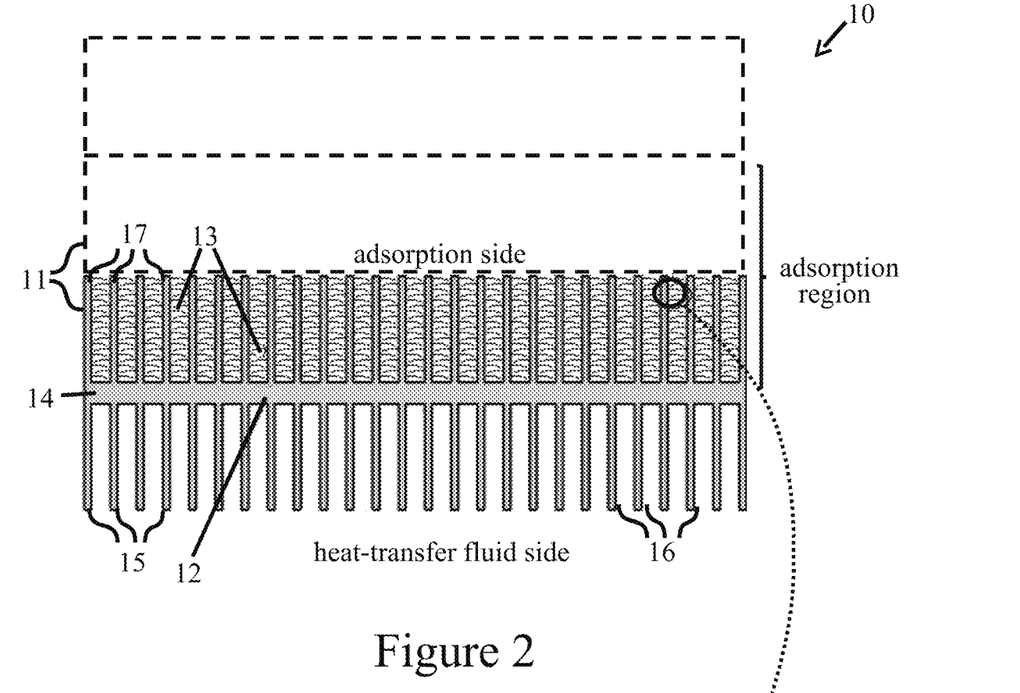
FIG. 2 is a schematic illustration of adsorber apparatus employing a first adsorption heat exchanger device embodying the invention.

FIG. 2 illustrates adsorber apparatus embodying the invention for use in adsorber units 2 of system 1. The adsorber apparatus 10 comprises a pair of substantially identical adsorption heat exchanger devices 11, one of which is indicated for simplicity by the broken lines in the figure. The basic structure of the adsorption heat exchanger devices 11 is indicated by the schematic cross-sectional view of the lower device shown in the figure. The device 11 consists of a heat exchanger 12 which has an adsorption structure 13 formed on one side thereof. In this example, the heat exchanger 12 is in the form of a metal plate 14 having a series of projections, in the form of high aspect ratio fins, extending substantially at right angles to both surfaces of the plate 14. The fins 15 on the lower side of plate 14 in the figure define channels 16 for conveying heat-transfer fluid (HTF) in operation. The fins 17 on the opposite, adsorption side of plate 14 provide support for the adsorption structure 13 and extend into the adsorption region of the apparatus. In particular, the two devices 11 are arranged with their adsorption sides facing one another whereby the region between the two plates 14 defines the adsorption region for passage of adsorbate vapor in use. The elongate cross-section of fins 17 in a direction extending into the adsorption region has a high-aspect ratio, preferably about 20:1 or even higher, with the fins 15 on the HTF side being similarly formed in this embodiment. The dimensions of the various structures illustrated schematically in the figure will depend on the particular materials and processes used to fabricate device 11. Detailed examples of materials and processes are given below. By way of illustration, however, fin height in this embodiment may be approximately 5 mm, fin periodicity may be about 2 mm and the thickness of plate 14 may be approximately 0.5 mm.

Figure 3:
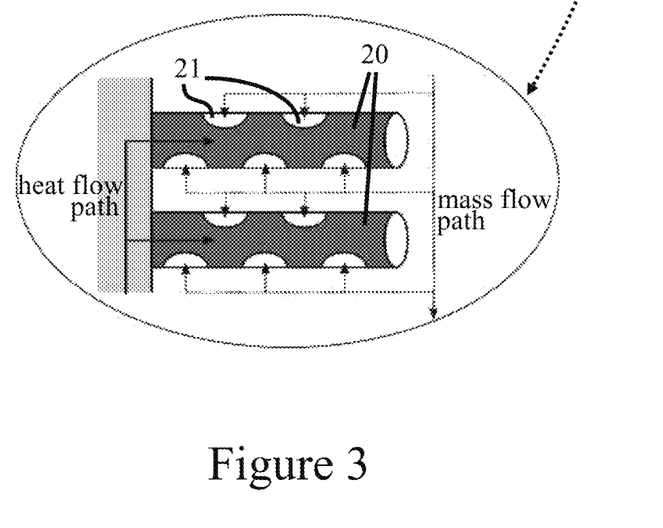
FIG. 3 is an enlarged illustration of adsorption elements of the adsorption heat exchanger device in FIG. 2.
Figure 4:
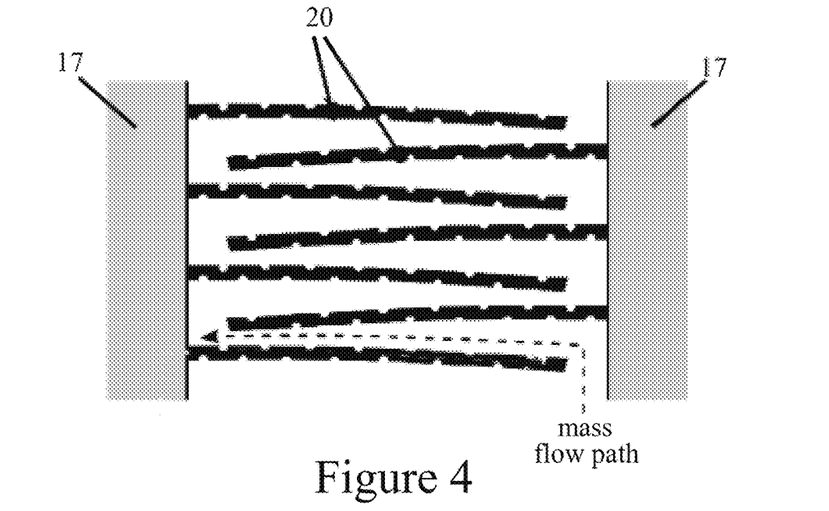
FIG. 4 is another enlarged illustration showing adsorption elements on adjacent heat exchanger projections in the FIG. 2 device.

The adsorption structure 13 formed on heat exchanger fins 17 comprises a plurality of elongate adsorption elements extending outwardly from each of the fins 17 into the adsorption void between adjacent fins. These adsorption elements provide for adsorption of the adsorbate in use. The adsorption elements of this embodiment are inherently adsorbent fibers, here in the form carbon nanotubes which are grown directly on the surfaces of heat exchanger fins 17 by a process discussed further below. The nanotubes 20 are indicated more clearly in FIGS. 3 and 4. FIG. 3 shows a schematic enlarged view of the indicated portion of the adsorption structure 13 in FIG. 2. FIG. 4 shows a larger-scale view illustrating the arrangement of nanotubes between adjacent fins 17. On each fin 17, the 20 are substantially mutually aligned and extend substantially perpendicularly to the surface and extent of that fin. For example, the nanotubes may extend at angles of within about 5° of the perpendicular. Note, however, that the nanotubes need not be completely rigid over their length. Thus, while the initial growth angle of nanotubes may be about 90°±5°, for example, flexing/bending/curvature of nanotubes may result in increased deviation from the perpendicular towards their free ends. The length of nanotubes 20 and separation of fins 17 are such that the nanotubes on adjacent fins 17 are interleaved with one another as illustrated schematically in FIG. 4. Though inherently porous and adsorbent to the adsorbate (water or methanol) used in system 1, the adsorbency of the nanotubes 20 is further enhanced by an activation process described below. The activation process establishes an open network of pores 21 by removal of material in nanotubes 20, increasing the active surface area and hence available adsorption sites.

The resulting arrangement of dense, aligned and interleaved activated carbon nanotubes, extending substantially perpendicularly to heat exchanger fins 17 which project into the adsorption region, provides a high-aspect ratio hierarchical structuring of both the solid phase and the void phase (adsorption region) of device 11. The heat exchanger fins provide a first level of the hierarchical structure, providing efficient heat flow into the adsorption region, and supporting the adsorption structure which is synthesized directly on the heat exchanger to give a high wall heat transfer coefficient with subsequent generation of adsorption sites by in situ activation. The high-aspect ratio adsorption structure provides a second hierarchical level, facilitating heat transport further into the adsorption region and offering a large active surface area with high permeability to adsorbate. This hierarchical device structure thus provides for highly efficient heat and mass (adsorbent) flow paths as indicated by the dashed arrows in FIGS. 3 and 4. The device 11 of this embodiment thus provides good thermal conductivity coupled with high permeability to adsorbate, leading to highly efficient operation.

Figure 5:
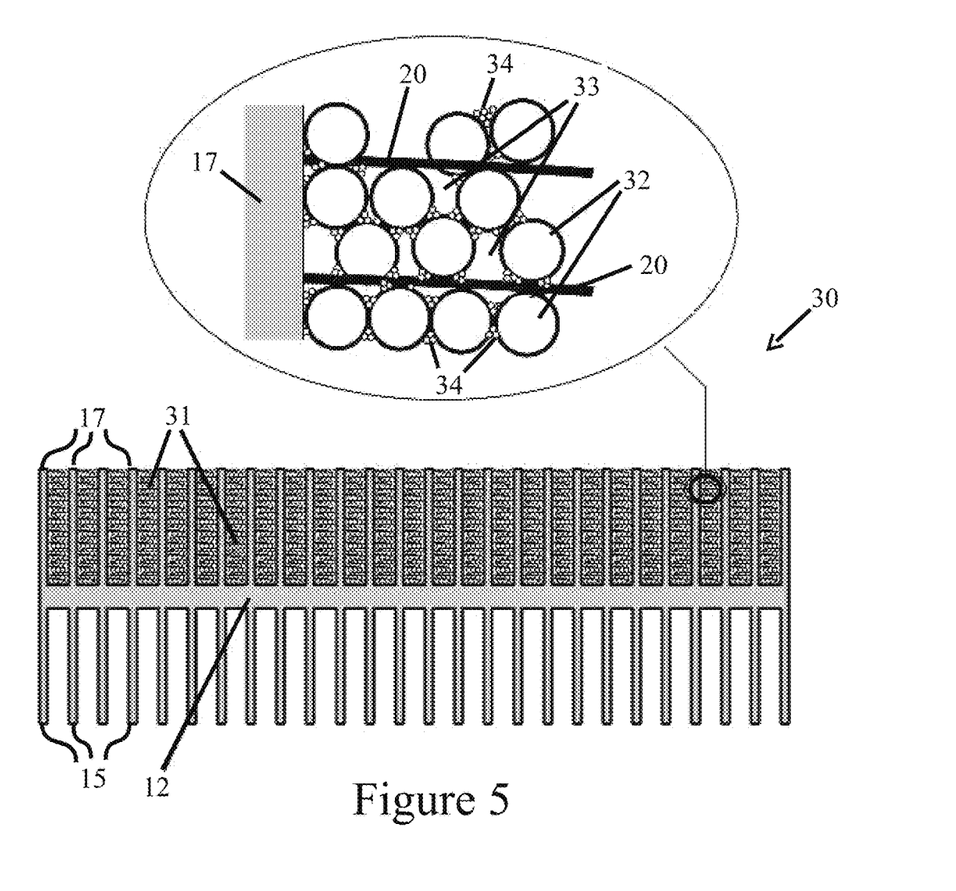
FIG. 5 is a schematic illustration of a second adsorption heat exchanger device embodying the invention.

FIG. 5 shows a second, preferred embodiment of an adsorption heat exchanger device for use in cooling system 1. This preferred device 30 incorporates the basic structure of device 11 described above, and like elements are denoted by like reference numerals in FIG. 5. In particular, device 30 includes the basic heat exchanger 12, and adsorption elements, here nanotubes 20, on heat exchanger fins 17 as already described with reference to FIGS. 2 to 4. However, the overall adsorption structure 31 of device 30 is further enhanced by addition of adsorbent particles to infiltrate the high aspect ratio adsorbent nanotubes and further extend the hierarchical structure described above. In this especially preferred embodiment, a bimodal particle size distribution is employed for the additional particulate material, with one mode being significantly smaller than the other. The form of the resulting adsorption structure 31 is illustrated schematically in the enlarged section of FIG. 5.

As illustrated in the enlargement, the adsorption structure 31 includes a first particulate (i.e. granular) material, comprising first adsorbent particles (i.e. granules) 32, which is applied to the carbon nanotubes 20. The size of these first particles 32 is such that the particles can enter between adjacent nanotubes 20 as shown, but the size is also sufficiently large, e.g. greater that about 0.2 mm here, that the void spaces 33 between the particles remain sufficient to facilitate mass transfer. The particulate adsorbent 32 may be porous carbon, which exhibits similar adsorption behaviour to the activated carbon nanotubes already present in the adsorption structure. Alternatively, a different adsorbent material, such as zeolites or silica gel, may be employed to exhibit different adsorption properties and form a composite adsorbent system. Such a composite adsorbent system may be beneficial when large temperature swings of the adsorbent are encountered, when an adsorbent such as silica gel will tend to release a large fraction of adsorbate at lower temperatures while activated carbon will tend to release a large fraction of adsorbate at higher temperatures. A composite adsorbent system may therefore outperform singular adsorbent systems when driving heat is supplied over a large temperature range.

The adsorption structure 31 further includes a secondary particulate material applied to the carbon nanotubes 20. This material comprises secondary particles 34 of smaller size than the first particles 32. The size difference is such that the secondary particles 34 can enter between adjacent first particles 32 near the contact points thereof. The characteristic size of the second particles 34 should be less than that of the first particles by a factor of at least about 10 and ideally by a factor of at least about 100. With a small enough secondary particle size, the secondary particles 34 will accumulate near contact points between the first particles 32, enhancing thermal contact and thus improving thermal conductivity through the adsorbent structure 31.

The secondary particles 34 may be adsorbent particles, e.g. of silica gel, in which case both the first and secondary particles serve to enhance adsorbency and improve the adsorbent volume filling fraction in device 30. Alternatively, the secondary particles need not necessarily act as adsorbent, but may serve solely as agents for improved thermal conductivity. In this case, secondary particles with higher thermal conductivity, e.g. of alumina or silver, may be used. The thermal conductivity of the agglomerate consisting of secondary particles may be further improved by sintering at a high temperature to bond the secondary particles and reduce or eliminate voids between the secondary particles.

Device 30 retains the benefits of device 11 discussed above and provides still further advantages. In particular, direct growth of aligned nanotubes on the heat exchanger fins, in combination with subsequent generation of adsorption sites by in situ activation and filling with particulate adsorbents as described, allows the device to be optimized for heat and mass transfer. The addition of particulate material with a bimodal size distribution extends the hierarchical structuring of solid and void phases of the adsorption heat exchanger apparatus. The resulting multilevel hierarchical structure, with progressively smaller feature sizes along the flow paths of heat and adsorbate, further enhances heat and mass transport properties of the apparatus. In addition, the bimodal particulate material increases the volumetric density of adsorbent and improves thermal conductivity at contact regions between particles. Thermal dead mass is also low since the adsorbent material is free of binder. The combination of the highly-directional thermal conductivity of the carbon nanotubes and the bimodal particulate properties described above provides superior heat exchange rates to prior systems and higher cooling capacity per unit mass and volume. Overall, through the various improvements in the fraction of active mass and volume as well as improved heat and mass transfer within the adsorbent compared to prior systems, embodiments of the invention provide an important pathway for future high-performance solid sorption cooling devices.

Adsorption heat exchanger devices embodying the invention can be made using a variety of generally known processing techniques as will be readily apparent to those skilled in the art. Some examples are described in the following.

Heat exchanger fins with periodicities below 1 mm and high aspect ratio fins (e.g. in excess of 20:1) can be produced, for example, by LIGA (lithography, electroplating and molding) or related processes. Other technologies for the production of high aspect ratio heat exchanger structures include cutting (skiving) of metals, milling, electro-discharge or ultrasonic/waterjet cutting.

Techniques from various known manufacturing methods for the production of aligned and dense carbon nanotube materials, e.g. as discussed in US 2010/0196249 A1 referenced earlier, can be employed in producing the adsorbent structure of carbon nanotube (CNTs) on the heat exchanger fins. The CNTs may be grown perpendicularly to the fin surfaces by means of chemical vapor deposition (CVD) using a gaseous carbonaceous feedstock such as short-chain hydrocarbons ($CH_4$, $C_2H_2$, $C_2H_4$). The use of catalysts such as iron, nickel or cobalt enhance the CNT growth rate, and a growth enhancer such as water may be added to the feedstock gas in order to achieve long CNTs (i.e. tube lengths greater than 1 mm). Such procedures are well-known in the field of CNT synthesis. The catalyst may be coated on the heat exchanger via common techniques such as electroplating, electroless plating or evaporation. The heat exchanger may be formed of any convenient material with high thermal conductivity. The metals aluminum or copper provide commonly-used examples here. Alternatively, the heat exchanger itself may be constructed from a catalytically active material, e.g. steel (containing iron) or nickel.

After growth of CNTs on the heat exchanger fins, the surface area of the CNTs is enlarged by an activation process in an oxidizing medium. This activation may carried out by heating up to at least 500° C. in air, $CO_2$ or $H_2O$, or by chemical treatment in e.g. $ZnCl_2$ or $H_3PO_4$ up to at least 500° C., or in KOH up to at least 700° C. Such activation techniques are well-known in the field of activated carbons and enlarge the number of adsorption sites through the formation of micropores with dimensions of less than about 2 nm for example. Care should be taken to ensure inertness of the heat exchanger material during activation. For example, chemical activation by KOH can be performed in combination with a nickel heat exchanger, preferably in an inert atmosphere (nitrogen or argon). Activation in air, $CO_2$ or steam is preferably performed using steel, copper or nickel as heat exchanger materials.

To provide a large adsorption capacity, the CNTs used in embodiments of the invention may be either the single-walled or the multi-walled variety. This is because a major fraction of the final surface area is generated in the activation step and this can be performed with both single- and multi-walled CNTs. In contrast to applications where electronic or optical properties of CNTs are of primary interest, purification measures are not necessary in methods embodying the invention in order to obtain the desired benefits of the high aspect ratio structure. Non-tubular carbon, which is present after CNT growth in the form of soot, carbon black or other sp2-hybridized carbon structures, undergoes a similar increase in surface area as the CNTs upon activation and thus also contributes adsorption sites.

After high aspect ratio CNT growth and adsorption site generation through activation, further adsorbents can be added to the system, e.g. in particulate form as discussed above, to increase the adsorption capacity and improve the cooling capacity per unit volume. A preferred method for doing this is by dispensing a suspension of the adsorbent particles onto the CNTs on the adsorbent side of the heat exchanger structure. The particulate adsorbents will sediment and tend to form percolating networks upon evaporation of the carrier solution. The carrier solution is preferably aqueous and may contain a certain (e.g. less than about 50% by weight) mass fraction of surfactant in order to disperse the particulate adsorbent. As described earlier, where bimodal particulate material is employed, a sintering step at elevated temperatures may be introduced to improve thermal transport via the smaller, secondary particles and effectively expand contact points of the larger particles.

While preferred embodiments have been described in detail above, it will be appreciated that many changes and modifications can be made to the exemplary embodiments described. By way of example, the adsorber apparatus 10 could include more than one pair of devices 11, 30, e.g. arranged in a stack. Adsorption heat exchanger devices embodying the invention can also be formed with a variety of overall shapes other than the generally plate-like structures described above. For example, the basic structures described could be folded, bent or otherwise shaped in some fashion and/or formed into a closed structure such as a pipe with a cylindrical, hexagonal or other desired cross-sectional shape to contain and channel HTF if desired. The heat exchanger structure need not of course be symmetrical on the HTF and adsorbent sides. Fin height may differ, for example, or fins may be omitted on the HTF side or replaced by some other surface formation. Also, in some embodiments heat transfer between the environment and heat exchanger structure could occur by direct irradiation or convection rather than via HTF, and the heat exchanger structure could be adapted accordingly. Heat may, for instance, be supplied by solar irradiation. In this case, the heat exchanger structure of the integrated device could serve as the external housing of the adsorption apparatus. Numerous other constructions can be envisaged and, in general, adsorber apparatus embodying the invention could comprise one or more adsorption heat exchanger devices arranged to define an adsorption region for passage of the adsorbate vapor.

While fins provide a particularly preferred implementation for the heat exchanger projections on the adsorption side, in other embodiments these projections could be different features such as pins, lamellae, bends, folds or other projecting formations and may in general be regular or irregular formations. In other embodiments, the fins or other projections on either side of the heat exchanger could themselves be hierarchically patterned. That is, the fins, for instance, may be formed in a hierarchically repetitive pattern of larger fins having smaller surface fins which in turn have smaller surface fins, and so on as far as the processing technique employed allows. In such a case the elongate adsorption elements of the subsequently formed adsorption structure can extend outwardly from the surfaces of the smallest hierarchical level of heat-exchanger fins.

In addition, or as an alternative, to activation of the adsorbent fibers by pore creation, e.g. by oxygen treatment of the CNTs as described above, adsorbent material could be deposited on the fibers via a sol-gel process (e.g. using porous silica or zeolite) which can easily access the void space between fibers. Sol-gel processes are well known in materials science and need not be described in detail here. During the sol-gel process, templating agents may be used, again in generally known manner, to introduce another level of pore hierarchy with defined pore size which is beneficial for mass transport. Note that high thermal conductivity of the adsorbent is maintained also in this case due to the high aspect-ratio fibers and substantially continuous nature of the adsorbent coating.

While activation of adsorbent elements such as CNTs is generally preferred, the elements need not necessarily be activated if they are coated with adsorbent using a sol-gel process or if they are surrounded by particulate adsorbent. Indeed, in alternative embodiments, the adsorption elements need not be formed wholly of inherently adsorbent material. In particular, the adsorption elements may be formed of a thermally conductive material having an adsorbent material thereon. Examples of suitable elements with high thermal conductivity include metal or ceramic fibers to which adsorbent can then be applied. The adsorbent material here may be a film-like coating, e.g. porous silica or zeolite applied via a sol-gel process, and/or a particulate adsorbent material which may have a bimodal size distribution as described above. Note, however, that if the adsorption elements are formed using non-adsorbent, thermally conductive fibers then these fibers add to the dead mass of the device and should ideally occupy as little volume as possible and have a low density.

While carbon nanotubes provide a particularly preferred example of inherently adsorbent fibers, fibers of other adsorbent materials can be envisaged, for instance porous titania, alumina or silica. Other forms of elongate adsorption element, in particular elements not formed using material fibers, might also be employed in embodiments of the invention.

Many other changes and modifications can be made to the embodiments described above without departing from the scope of the invention.

The invention claimed is:

1. An adsorption heat exchanger device for a solid sorption refrigeration system, the device comprising a heat exchanger comprising a plate having a plurality of first projections extending from a first surface of the plate and a plurality of second projections extending from a second surface of the plate, wherein the plurality of first projections are arranged for extending into an adsorbate of a system in use, the plurality of second projections define channels for conveying heat-transfer fluid; and an adsorption structure formed on the heat exchanger for adsorption of said adsorbate, wherein the adsorption structure comprises a plurality of elongate adsorption elements extending outwardly only from each of said first projections.

2. The device as claimed in claim 1, wherein the first projections have a cross-section which elongates in the direction extending into the adsorbate.

3. The device as claimed in claim 2, wherein the first projections comprise of at least one of: fins, pins, and lamellae.

4. The device as claimed in claim 1, wherein each elongate adsorption element extends perpendicularly to the surface of the projection on which that element is formed.

5. The device as claimed in claim 4, wherein the first projections and the elongate adsorption elements are arranged so that the elongate absorption elements on adjacent first projections are interleaved.

6. The device as claimed in claim 1, wherein the elongate adsorption elements on said first projections are mutually aligned.

7. The device as claimed in claim 1, wherein the elongate adsorption elements comprise of fibers.

8. The device as claimed in claim 1, wherein the elongate adsorption elements are formed of an inherently adsorbent material.

9. The device as claimed in claim 8, wherein the elongate adsorption elements are formed of an activated adsorbent material.

10. The device as claimed in claim 8, wherein the elongate adsorption elements comprise of carbon nanotubes.

11. The device as claimed in claim 1, wherein the adsorption structure includes an adsorbent material applied to the elongate adsorption elements.

12. The device as claimed in claim 1, wherein the elongate adsorption elements are formed of a thermally conductive material having an adsorbent material.

13. The device as claimed in claim 12, wherein said adsorbent material comprises a first particulate material applied to the thermally conductive material which comprises adsorbent particles of a first size.

14. The device as claimed in claim 13, wherein the adsorption structure includes a secondary particulate material applied to the elongate adsorption elements and wherein the secondary particulate material comprises secondary particles of a second size, which are less than said first size, as to permitting entry of the secondary particles between adjacent adsorbent particles of the first particulate material near contact points.

15. The device as claimed in claim 1, wherein the adsorption structure includes a first particulate material applied to the elongate absorption elements and wherein the first particulate material comprises adsorbent particles of a first size permitting entry of the particles between adjacent elongate adsorption elements of the structure.

16. The device as claimed in claim 1, wherein said heat exchanger device is in an adsorber apparatus for a sold sorption refrigeration system; and said heat exchanger device defines an adsorption region for passage of adsorbate and being so that said first projections extending into the adsorption region.

* * * * *